US008813365B2

(12) United States Patent  (10) Patent No.: US 8,813,365 B2
Smith et al.  (45) Date of Patent: Aug. 26, 2014

(54) PEPPER CORER SET

(75) Inventors: Adam R. Smith, Portland, OR (US); Joseph Kent, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 174 days.

(21) Appl. No.: 13/365,878

(22) Filed: Feb. 3, 2012

(65) Prior Publication Data

US 2012/0198699 A1 Aug. 9, 2012

Related U.S. Application Data

(60) Provisional application No. 61/440,612, filed on Feb. 8, 2011.

(51) Int. Cl.
 *A47J 25/00* (2006.01)
(52) U.S. Cl.
 CPC ........................................ *A47J 25/00* (2013.01)
 USPC .............. 30/113.1; 30/113.3; 30/301; 30/316
(58) Field of Classification Search
 USPC ............. 30/113.1, 113.3, 301, 316, 358, 359; D7/691
 See application file for complete search history.

(56) References Cited

U.S. PATENT DOCUMENTS

| | | | | |
|---|---|---|---|---|
| 185,902 A | * | 1/1877 | Fallows | 30/113.1 |
| 198,219 A | * | 12/1877 | Schell | 30/301 |
| 965,991 A | * | 8/1910 | Craig | 30/359 |
| 1,797,859 A | * | 3/1931 | Gage et al. | 30/301 |
| 2,082,982 A | * | 6/1937 | Schumacher | 30/113.1 |
| 2,402,558 A | * | 6/1946 | La Berge | 30/113.3 |
| 2,655,709 A | * | 10/1953 | Gentry | 30/301 |
| 3,292,257 A | * | 12/1966 | Popeil | 30/301 |
| 3,667,519 A | * | 6/1972 | Shadduck | 30/263 |
| 3,936,934 A | | 2/1976 | Bowden | |
| 4,136,447 A | | 1/1979 | Gillham, Sr. | |
| 4,310,969 A | | 1/1982 | Cannizzaro et al. | |
| 4,572,444 A | * | 2/1986 | Shadduck | 241/168 |
| 4,596,073 A | | 6/1986 | Ewald | |
| 4,763,414 A | | 8/1988 | McNeill, II | |
| D461,691 S | | 8/2002 | Huang et al. | |
| D610,884 S | | 3/2010 | Rabanal | |
| 2011/0167645 A1 | * | 7/2011 | Bagley et al. | 30/142 |

* cited by examiner

*Primary Examiner* — Hwei C Payer
(74) *Attorney, Agent, or Firm* — Lowe Graham Jones PLLC

(57) ABSTRACT

A pepper corer set includes two separate pepper corers, each one of which is configured to remove a different sized core from a different sized pepper. A first pepper corer is configured to remove a stem and facilitate removal of the core from a relatively large variety of pepper such as a bell pepper, while a second pepper corer is sized to remove a stem and facilitate removal of the core from a smaller pepper, such as a jalapeno pepper.

13 Claims, 4 Drawing Sheets

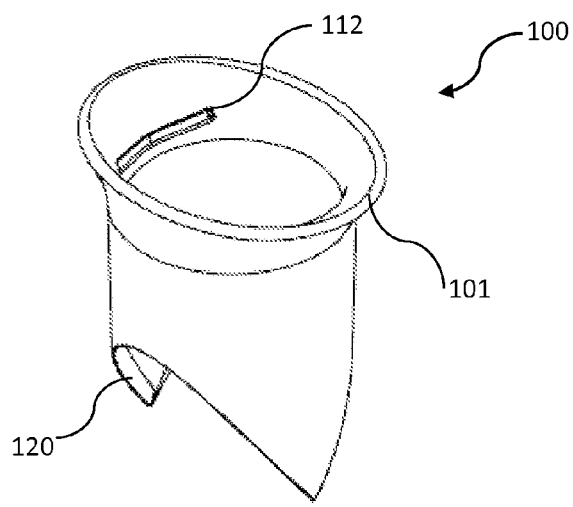
*Fig. 2*
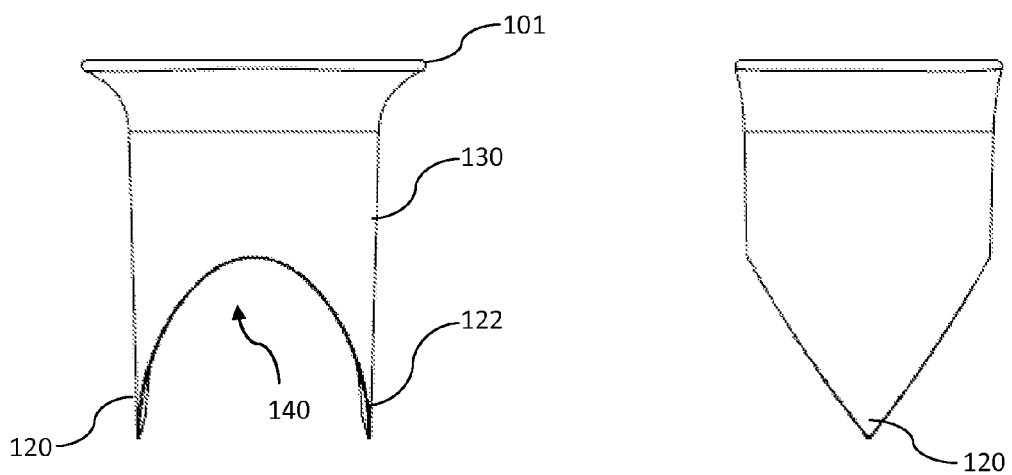 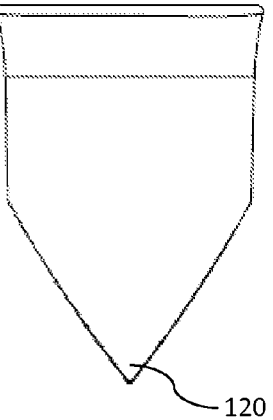
*Fig. 3* *Fig. 4*

PEPPER CORER SET

PRIORITY CLAIM

This application claims the benefit of provisional application Ser. No. 61/440,612 filed Feb. 8, 2011, the contents of which are incorporated by reference.

FIELD OF THE INVENTION

The present invention relates to kitchen tools, particularly including tools for removing the core of a pepper or similar fruit or vegetable.

BACKGROUND OF THE INVENTION

Removing the top of a pepper can be a difficult chore. Many bell peppers can be oddly shaped, making a uniform removal of the top and stem an awkward task. Cooks often use a paring knife for this purpose, and although paring knives have relatively small blades it can still be a challenge to remove the stem safely without also inadvertently cutting away more pepper than desired.

This task is compounded when confronted by the many different types and sizes of peppers. Removing the stem from smaller peppers such as jalapenos and the like can be especially difficult when using a knife. Once the stem is removed the challenge of removing seeds and membranes remains, and current tools are inadequate for the task.

SUMMARY OF THE INVENTION

The preferred version of the invention includes two separate pepper corers, each one of which is configured to remove a different sized core from a different sized pepper. In general, a first pepper corer as described below will be referred to as a large pepper corer while a second one will be referred to as a small pepper corer.

Preferably, the large pepper corer is configured to remove a stem and facilitate removal of the core from a relatively large variety of pepper such as a bell pepper. The small pepper corer is preferably sized to remove a stem and facilitate removal of the core from a smaller pepper, such as a jalapeno pepper.

In the preferred example, the large corer includes interior grooves or other features for receiving a rim or flange of the smaller corer so that the small corer may be attached to and stored within the large corer.

BRIEF DESCRIPTION OF THE DRAWINGS

The description of the invention is made with reference to the following drawings.

FIG. 2 is a perspective view of a large pepper corer.
FIG. 3 is a front view of a large pepper corer.
FIG. 4 is a side view of a large pepper corer.

DETAILED DESCRIPTION OF THE PREFERRED EMBODIMENT

A preferred pepper corer set in accordance with the present invention includes a large pepper corer 100 and a small pepper corer 200, with the large corer being sized to receive the smaller corer within it for convenient storage. The two pepper corers are shown nested with one another in FIG. 1.

Figure 5:
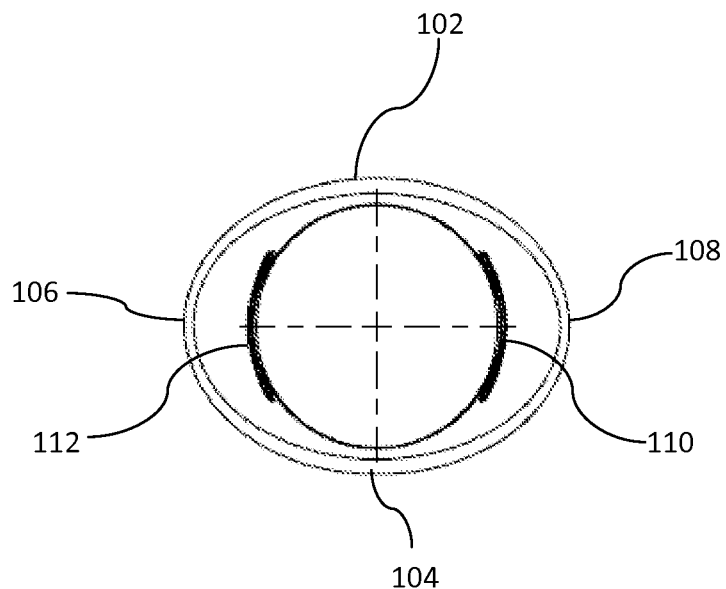
FIG. 5 is a top view of a large pepper corer.
Figure 6:
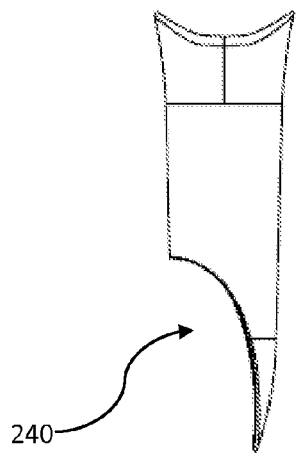
FIG. 6 is a side view of a small pepper corer.
Figure 7:
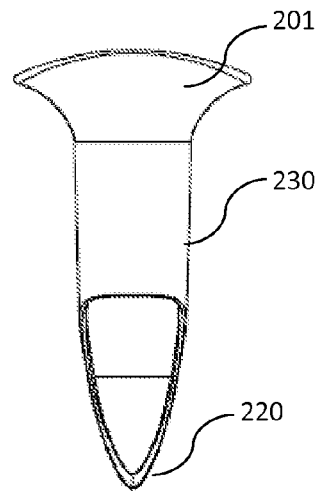
FIG. 7 is a front view of a small pepper corer.
Figure 8:
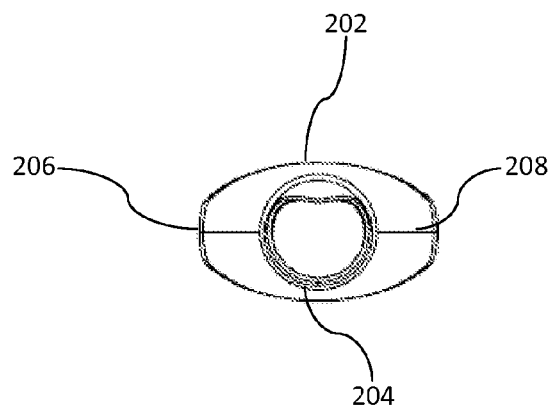
FIG. 8 is a top view of a small pepper corer.
Figure 9:
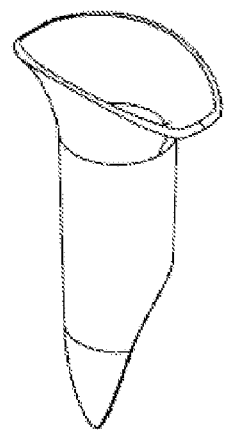
FIG. 9 is a perspective view of a small pepper corer.

The large corer includes an upper rim 101 that flares outwardly toward the top. In general, the upper rim is shaped to facilitate grasping as a handle and may be shaped differently than as shown. In the illustrated example as best seen in FIG. 5, the upper rim is oval in shape as defined by the perimeter of the rim, with two opposing sides 102, 104 opposite the minor diameter and two sides 106, 108 opposite the major diameter.

The body 130 of the larger corer forms a substantially straight cylinder terminating at its upper end at a location where the upper rim 101 begins to flare outwardly. At the lower end of the body 130, a pair of opposing arched cutouts 140 in the cylinder define a pair of opposing blades 120, 122. The blades 120, 122 each terminate in a point at the lowest edge of the body of the large corer and flare outwardly as they extend upwardly along the edge defined by the arched cutout, with each of the upper ends of the opposing blades meeting one another at the top of the arched cutouts. Thus, the body of the large corer is symmetrical about either of two perpendicular axes, one of which bifurcates the arched cutouts and the other of which bifurcates each of the opposing blades.

In the illustrated version, the length of the blade from the tip of the blade to the top of the arched cutout is about half the overall height of the body of the large corer.

In other versions of the invention, the large corer may be formed with a single blade or with more than two blades.

An inner portion of the rim 101 includes channels or grooves 110, 112 for receiving a rim of a small corer, as discussed further below. Most preferably, a pair of grooves is provided, with one groove placed along each of the two ends 106, 108 of the rim at opposite ends of the major axis. The grooves are positioned to receive and retain portions of the rim of a small corer to retain the small corer within the cavity defined by the large corer.

Most preferably, the grooves are formed on the rim of the large corer, at a location where the rim has flared outwardly at least somewhat from the inner diameter of the cylinder forming the body of the large corer. Accordingly, the inner diameter of the corer body is smaller than the diameter spanning from one groove to the opposite groove so that the smaller corer will fit within the space between the grooves but cannot fall all the way through the large corer.

The small corer 200 as best seen in FIGS. 6-9 is shaped somewhat similarly in that it includes an upper rim 201 and a cylindrical body 230 terminating in a blade 220. The rim 201 flares outwardly at the top and includes a pair of opposing sides 206, 208 defining a length that is greater than a width defined by a distance spanning the intermediate opposing sides 202, 204. Thus, the perimeter of the rim is substantially oval or rounded-rectangular in shape when viewed from the top, as in FIG. 8.

When viewed from the side, the rim has a saddle shape in which the opposing long sides 202, 204 have a height that is above the height of the opposing short sides 206, 208. As discussed further below, this configuration facilitates grasping of the small corer to remove it from its position seated within the large corer.

The blade 220 of the small corer is formed by a large arched cutout 240 removing the majority of the sidewall of the cylindrical body 230 to form the blade. At an intermediate height generally at its midpoint, the blade has a width of less than 90 degrees of the arc forming the sidewall of the cylinder, and preferably less than about 45 degrees. At its lower end, as it approaches the tip, the sidewall forming the blade curves inward, toward the central axis defined by the cylindrical body. Each of the edges of the blade 22 is sharpened, as is the case with the edges of the blade for the large corer.

As noted above, the small corer preferably includes only a single blade. In general, this is because the diameter of the small corer main body 230 is sufficiently small that a single blade provides a better cutting surface. The use of two or more blades is less than ideal, generally providing insufficient clearance between blade edges to readily remove the material being cut. Nonetheless, in other versions of the invention the small corer may be formed with more than a single blade.

Each of the large corer and the small corer is preferably integrally formed from plastic using techniques such as injection molding, but may also be formed from other materials or using different manufacturing techniques.

For storage purposes, the small corer may be placed within the large corer. Accordingly, the small corer is formed with an outer diameter of its main body that is less than the inner diameter of the main body of the large corer. The width between the edges of the rim 206, 208, however, is greater than the inner diameter of the main body of the large corer so that the small corer does not fall all the way through the large corer.

Figure 1:
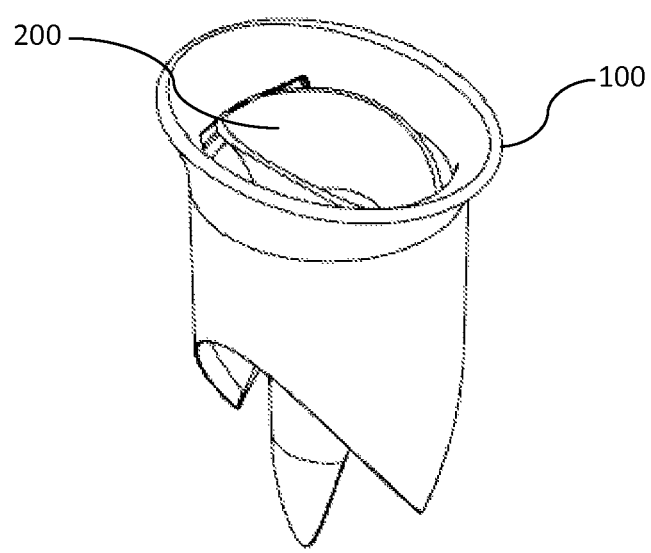
FIG. 1 is a perspective view of a pepper corer set, shown with a small pepper corer stowed within a large pepper corer.

The edges of the rim 206, 208 are sized so that they can be received within the grooves 110, 112 formed in the rim of the large corer, as shown in FIG. 1. Preferably the width of the rim of the small corer is somewhat greater than the width between the grooves formed in the large corer so that the small corer will be snap-fit into the large corer and will not readily fall out once it is snapped into place.

While the illustrated version includes grooves or channels to receive the small corer, other versions may use different means for retaining it. For example, rather than recessed grooves the large corer may include tabs extending inward toward the center of the corer, requiring the small corer to be pressed over the tabs where they may be retained in place by the tabs. Likewise, grooves may be formed on the outer sidewalls of the small corer, with complementary tabs or other surfaces formed on the inner surface of the rim of the large corer to be received within the grooves to hold the two corers together.

The generally elliptical shape of the large corer facilitates removal of the corers from one another. By squeezing the narrower sides of the large corer, the sides along the longer diameter will move apart from one another, thereby releasing the small corer rim from within the grooves. The raised saddle shape of the small corer likewise provides a read means for grasping the small corer in order to pull it out from within the large corer.

In use, with each corer, the blade is plunged into the pepper such that the stem is substantially aligned with the center of the corer. The corer is then rotated about its central axis so that the blade will cut into the pepper in a substantially circular fashion. Most preferably, the blade is formed to be sufficiently long such that it will also cut the inner membranes of the pepper while cutting the upper portion around the stem. The tapered lower edge of the small corer allows it to cut the interior membranes without cutting all the way through the opposite end of the pepper.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A pepper corer set, comprising:
a first pepper corer having a first outwardly flared rim, a first blade, and a first cylindrical main body integrally formed with and extending axially between the first outwardly flared rim and the first blade, the first blade comprising a pair of blades diametrically opposite one another, each of the pair of blades having a pair of sharpened edges terminating at one point; and
a second pepper corer having a second outwardly flared rim, a second blade, and a second cylindrical main body integrally formed with and extending axially between the second outwardly flared rim and the second blade;
wherein the first main body is larger than the second main body, whereby the second pepper corer is removably storable within the first pepper corer; and
wherein the first outwardly flared rim is formed from a material that is sufficiently pliable such that opposing sides of the first outwardly flared rim are movable toward one another whereby the second pepper corer can be released from the first pepper corer.

2. The pepper corer set of claim 1, wherein the first outwardly flared rim of the first pepper corer is non-circular.

3. The pepper corer set of claim 2, wherein the first outwardly flared rim of the first pepper corer further comprises a pair of surfaces formed on the opposing sides of the first outwardly flared rim, wherein the second outwardly flared rim is received within the pair of surfaces to retain the second pepper corer within the first pepper corer.

4. The pepper corer set of claim 3, wherein the pair of surfaces comprises a pair of channels formed in the first outwardly flared rim.

5. The pepper corer set of claim 4, wherein the second outwardly flared rim is non-circular.

6. The pepper corer set of claim 1, wherein the first blade further comprises an arch formed between the pair of blades.

7. The pepper corer set of claim 1, wherein the second outwardly flared rim is formed by a pair of opposing short sides and a pair of opposing long sides, the pair of opposing long sides having a height extending axially above the pair of opposing short sides.

8. A pepper corer set, comprising:
a first pepper corer having a first outwardly flared rim, a first blade, and a first cylindrical main body integrally formed with and extending axially between the first outwardly flared rim and the first blade; and
a second pepper corer having a second outwardly flared rim, a second blade, and a second cylindrical main body between the second outwardly flared rim and the second blade;
the first cylindrical main body further being larger than the second cylindrical main body, whereby the second pepper corer is removably storable within the first pepper corer;
the first pepper corer and the second pepper corer further each having mating interlocking surfaces, whereby when the second pepper corer is received within the first pepper corer the interlocking surfaces retain the second pepper corer within the first pepper corer; and
wherein the first outwardly flared rim is formed from a material that is sufficiently pliable such that opposing sides of the first outwardly flared rim are movable toward one another whereby the second pepper corer can be released from the first pepper corer.

9. The pepper corer set of claim 8, wherein the mating interlocking surfaces comprises a pair of channels formed in the first outwardly flared rim and a pair of edges formed on the second outwardly flared rim.

10. The pepper corer set of claim 8, wherein the first blade comprises a pair of diametrically opposed blades having sharpened edges and terminating in a point.

11. The pepper corer of claim 10, wherein the pair of blades is defined by a pair of opposing and symmetrical arched cutouts.

12. The pepper corer of claim 8, wherein the second blade comprises a single blade having a pair of sharpened edges terminating at a point, the single blade formed by a single arched cutout in the second cylindrical main body.

13. The pepper corer of claim 12, wherein the single blade curves inward toward a central axis of the second cylindrical main body.

\* \* \* \* \*